United States Patent Office 3,531,903
Patented Oct. 6, 1970

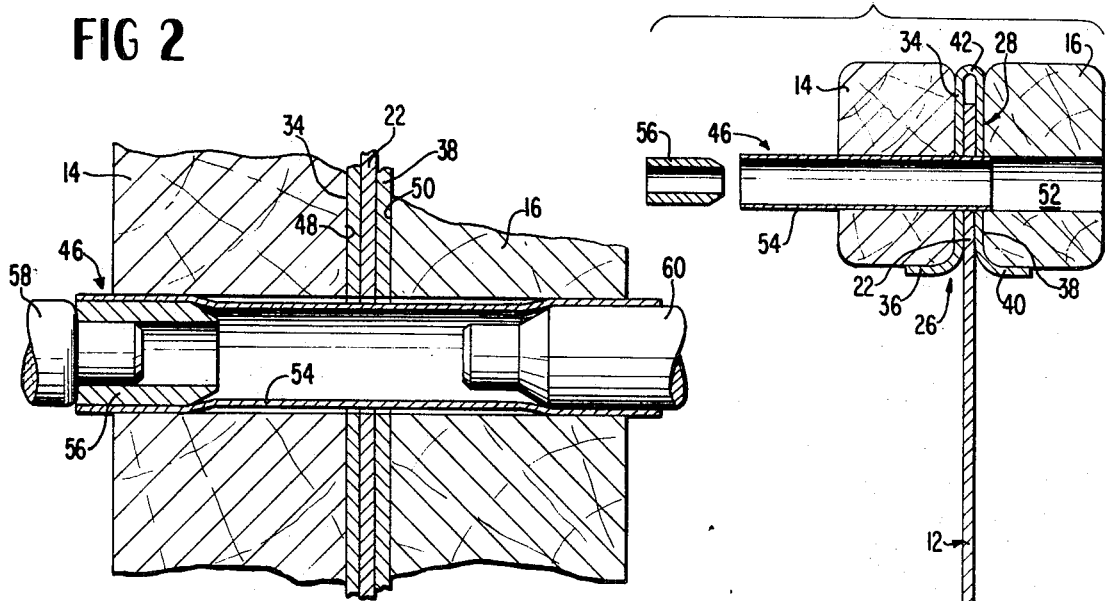
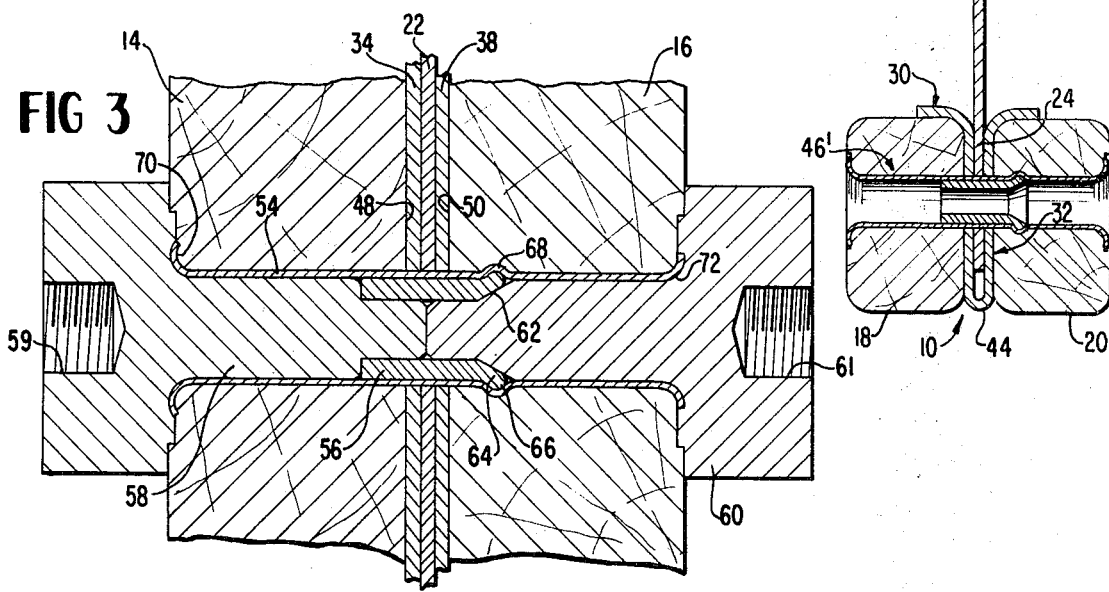
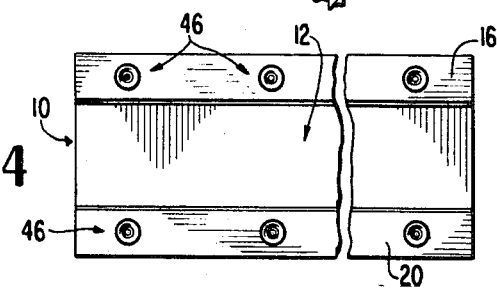

3,531,903
COMPOSITE STRUCTURE INCLUDING HOLLOW RIVET SHEAR CONNECTOR AND METHOD OF FORMING THE SAME
William D. Swanson, Coraopolis, Pa., assignor to National Steel Corporation, a corporation of Delaware
Filed Mar. 27, 1968, Ser. No. 716,383
Int. Cl. B23p *11/04;* E04c *3/36;* F16b *19/04*
U.S. Cl. 52—729
16 Claims

ABSTRACT OF THE DISCLOSURE

A hollow rivet connector integrates a composite structure, the connector including a stub reinforcing sleeve for enhanced shear strength. The hollow rivet is thin-walled, and in assembling the structure, the rivet is expanded by insertion of the sleeve. The sleeve is locked in position in the rivet by radially outward deformation of an end of the sleeve to form an annular locking rib on the sleeve and a recess in the rivet, with the locking rib secured in the recess. Flared portions on the ends of the rivet clinch the assembly together. The connector facilitates construction of composite beams having nailable wood flanges and a metal web.

BACKGROUND OF THE INVENTION

This invention relates to construction, and more particularly to composite members used in construction of buildings and other structures, and to rivet connectors for such composite members.

A main object of the invention is the provision of an improved, low-cost composite member and a hollow rivet connector therefor, which connector effectively resists shear forces tending to cause relative movement between elements of the composite member.

Another object of the invention is the provision of an improved, hollow rivet shear connector which can be formed in one operation by a single stroke of a press.

A further object of the invention is the provision of improved, low-cost fabricated structural sections having advantages of the nailability of wood and the strength of metal.

Other objects and advantages of the invention will appear from the following detailed description which, together with the accompanying drawings, discloses a preferred embodiment of the invention for purposes of illustration only and not for determination of the limits of the invention. For defining the scope of the invention, reference will be made to the appended claims.

BRIEF DESCRIPTION OF THE DRAWINGS

In the drawings, where similar reference characters denote similar elements throughout the several views:

FIG. 1 is a cross-sectional view of a composite beam section and shear connectors constructed in accordance with the principles of the invention;

FIG. 2 is a detail view depicting a stage in the formation of shear connectors according to the invention;

FIG. 3 is a detail view showing a later stage in the formation of shear connectors according to the invention; and FIG. 4 is a side elevational view of the structure of FIG. 1.

DESCRIPTION OF THE PREFERRED EMBODIMENT

In FIGS. 1 and 4, a generally I-section beam generally indicated at 10 comprises an elongated metal web plate generally indicated at 12, and elongated wooden flanges 14, 16, 18, 20. Wooden flanges 14, 16 are disposed on opposite sides of marginal edge portion 22 of web 12. Opposite marginal edge portion 24 of the web is interposed between wood flanges 18, 20.

Beam 10 includes metal brace members generally indicated at 26, 28, 30, and 32 respectively. Each brace has two leg portions, one leg portion interposed between one side of a marginal edge portion of web 12 and a flange, and the other leg portion projecting in a direction generally normal to the one leg portion and extending closely adjacent the same flange so as to be in supporting relation to the flange. For example, brace 26 includes a leg 34 interposed between flange 14 and marginal edge 22 of web 12. Leg 36 of brace 26 is turned under flange 14 to extend closely adjacent the flange to provide effective backing support. Similarly, brace 28 includes legs 38, 40 which are arranged in relation to flange 16 in a fashion corresponding to that in which legs 34, 36 of brace 26 are arranged with respect to flange 14. Opposing pairs of braces are formed from a single metal plate, and include curved interconnecting portions 42, 44 extending around the marginal edges of web 12. Connecting portion 42 interconnects legs 34, 38 of braces 26, 28, and connecting portion 44 interconnects corresponding legs on braces 30, 32. As shown, parts of connecting portions 42, 44 are in generally coplanar relationship with those outside surfaces of the wood flanges which are opposite the turned-under legs of the braces, so there is no large gap between the flanges.

The flanges, braces and web are secured together by a plurality of hollow rivet shear connectors, which are generally indicated at 46 and spaced longitudinally along the length of beam 10. In FIG. 1, connector 46 is shown in an early stage of formation, and connector 46' is completed. When the beam is installed in a building or other structure, the connectors must withstand substantial shear forces tending to cause contiguous elements of the beam to slide relatively to one another in a direction parallel to the planes of their juxtaposed surfaces. For example, shear forces tend to cause relative movement between flanges 14, 16, which have juxtaposed surfaces 48, 50 (FIG. 2). The shear forces also tend to cause relative movement between the flanges and web 12, and movement of the flanges and web relative to braces 26, 28. As shown, legs 34, 38, of braces 26, 28 have opposite surfaces in juxtaposed relationship to surfaces 48, 50 of flanges 14, 16, as well as to surfaces of marginal edge 22 of web 12. Hollow rivet connectors according to the invention effectively resist such shear forces and do so with a minimum of material and employ the material used to best advantage in forming a tight, secure joint.

In connecting the elements of the beam of FIG. 1, apertures of generally equal diameter are formed in flanges 14, 16, marginal edge 22 of plate 12, and legs 34, 38 of braces 26, 28. These apertures may be formed prior to or after assembly of the elements in the position shown. In either event, the apertures in the respective structural members are aligned to form an elongated cavity 52 having opposite open ends. An elongated tubular member or hollow rivet 54 is then inserted into cavity 52 and positioned with its opposite ends at the ends of the cavity (FIG. 2), and projecting slightly beyond for purposes to become apparent. Rivet 54 is of circular cross-section and has an outside diameter slightly less than the diameter of the apertures in the structural members.

A reinforcing member in the form of a sleeve 56 is placed on a tool 58 and inserted into one open end of rivet 54 while another tool 60 is inserted into the other open end of the hollow rivet. The outside diameter of circular sleeve 56 is greater than the inside diameter of rivet 54, and tool 60 has a diameter equal to the outside diameter of the sleeve, so that rivet 54 is progressively expanded from both ends inwardly along its longitudinal axis to place the outside walls of the rivet in tight frictional contact with the walls of the apertures. As the tools move axially inwardly in the cavity, rivet 54 is expanded uniformly along its length to form a tight connection. Tools 58, 60 are operated by a conventional hydraulic press (not shown), or other suitable device for connection to which threaded apertures 59, 61 are provided in the tools. As shown, the opposite ends of sleeve 56 are open to receive reduced-diameter end portions of tools 58, 60.

Tool 58 is manipulated (FIG. 3) to position sleeve 56 with its opposite ends spaced axially inwardly from the ends of the cavity and on opposite sides of the juxtaposed surfaces of the structural members which tend to move relatively to one another under influence of shear forces. Motion of tool 60 is coordinated with that of tool 58 so that upon such positioning of sleeve 56, tapered portion 62 on tool 60 deforms leading end 64 of sleeve 56 radially outwardly, thereby forming an annular locking rib 66 which presses into the inside walls of rivet 54 to form an annular recess defined by concave surfaces on the inside walls of the rivet. Rib 66 projects radially into the recess in the rivet, so sleeve 56 is secured against axial movement in rivet 54 by the locking rib. End 64 of thick-walled sleeve 56 is tapered so that it has a reduced wall thickness relative to the remainder of the sleeve, to facilitate the deformation which forms rib 66 and the recess.

Because of the thin wall thickness of rivet 54, deformation of end 64 of sleeve 56 radially outwardly to form locking rib 66 also produces a projection 68 on the rivet. Projection 68 presses into the walls of the aperture in wood flange 16 to produce an annular recess defined by concave surfaces on the walls of the aperture. This recess is radially aligned with the recess in the inside walls of rivet 54, because formed by the same radially outwardly directed force applied by tool 60. The annular recess in flange 16 is spaced inwardly from the ends of the cavity, and projection 68 forms an annular locking rib which extends radially into that recess.

Axial movement of rivet 54 in cavity 52 is prevented by annular flared portions 70, 72, which are formed on the ends of rivet 54 and clinch the assembly together. Projection 68 aids in prevention of such movement. Flaring of the ends of rivet 54 is effected by curved surfaces of tools 58, 60 as the tools reach the end of their inward movement. In the completed connector, both ends of stub sleeve 56 and locking ribs 66, 68 are spaced axially inwardly from the flared portions 70, 72.

Upon completion of formation of the locking rib and flared portions, tools 58, 60 are withdrawn to leave the completed connector as shown at 46' in FIG. 1. The completed connector forms a tight joint by virtue of expansion of rivet 54 into tight frictional contact with the walls of the apertures and by virtue of sleeve 56 having outside walls in tight frictional contact with the inside walls of rivet 54 and secured against axial movement in the rivet by locking rib 66. Flared portions 70, 72 and locking rib 68 prevent axial slippage of rivet 54 inside cavity 52, and the flared portions clamp together the structural members forming the composite. The advantages of a thin-walled hollow rivet in terms of low cost and ease of expansion are retained without sacrifice of shear strength because of the placement of thick-walled reinforcing sleeve 56 across planes of shear action. This has been effected with a minimum use of material since sleeve 56 is relatively short as compared to rivet 54. Further, such has been effected with maximum utilization of material of the sleeve to reinforce the connector and securely lock the sleeve in position. The connector permits connection of a plurality of members in a single operation, and facilitates construction of composite beams from wood and metal elements. Also, since plates supplied for use as webs 12 frequently have rough edges, interconnecting portions 42, 44 shield the rough edges and provide a relatively even surface for the top and bottom edges of beam 10, while permitting latitude in constructing beams of different height from web plates of given width.

As a specific example, a satisfactory connector includes a tubular member 54 of 0.622" inside diameter, 0.706" outside diameter and 3⅞ length, and inserted in a cavity 52 of 0.750" diameter. The reinforcing sleeve 56 in this example is of 0.423" inside diameter, 0.675" outside diameter, and 1" length.

Although the invention has been described in connection with a preferred embodiment, modifications of that embodiment can be made.

What is claimed is:
1. A composite member, comprising:
a plurality of structural members having juxtaposed surfaces,
means including walls defining aligned apertures in the structural members,
a tubular member extending through the aligned apertures and having
a longitudinal axis,
outside walls in tight frictional contact with walls of the apertures,
inside walls,
means including flared portions extending outwardly beyond the apertures, for clinching the structural members together, and
means defining at least one recess in the inside walls at a location spaced axially inwardly from the flared portions, and
a reinforcing member position within the tubular member and including
outside walls in tight frictional contact with inside walls of the tubular member,
opposite ends disposed on opposite sides of the juxtaposed surfaces and spaced axially inwardly from the flared portions of the tubular member, and
locking means projecting outwardly into the recess in the tubular member.
2. The composite member of claim 1,
the structural members including
a pair of wooden members, and
a metal plate member having a marginal edge portion interposed between the wooden members.
3. The composite member of claim 1,
the reinforcing member comprising a sleeve,
the locking means being formed on one end of the sleeve,
said one end of the sleeve having a wall thickness less than the remainder of the sleeve.
4. The composite member of claim 1,
the aligned apertures forming a cavity having opposite open ends,
the tubular member having opposite ends located at the ends of the cavity,
the flared portions being located at the ends of the tubular member.
5. The composite member of claim 1, including:
means defining at least one recess in the walls of an aperture,
the recess in the walls of the aperture being located in alignment with the recess in the inside walls of the tubular member, the tubular member including second locking means projecting outwardly into the recess in the walls of the aperture.

6. A method of forming a composite member, comprising:

providing a plurality of structural members having juxtaposed surfaces and means including walls defining aligned apertures forming a cavity having opposite open ends, inserting into the cavity a tubular member having opposite ends, outside walls, inside walls, and an outside diameter less than the inside diameter of the cavity, positioning the tubular member in the cavity with its ends located at the ends of the cavity, inserting a reinforcing member having opposite ends and an outside diameter greater than the inside diameter of the tubular member into the tubular member from one end of the tubular member and inserting a tool having an outside diameter equal to the outside diameter of the reinforcing member into the tubular member from the other end, thereby expanding the tubular member into tight frictional contact with walls of the apertures, positioning the reinforcing member with its opposite ends on opposite sides of the juxtaposed surfaces and spaced inwardly from the ends of the cavity, deforming one end of the reinforcing member outwardly, thereby deforming a portion of the tubular member to form at least one recess in the inside walls of the tubular member and to form locking means on the reinforcing member projecting outwardly into the recess, and flaring the ends of the tubular member to project outwardly beyond the cavity.

7. The method of claim 6, including:

inserting the reinforcing member into the tubular member with said one end of the tubular member leading the other end.

8. The method of claim 6, including:

forming at least one recess in the walls of an aperture and forming second locking means on the tubular member projecting outwardly into the recess in the walls of the aperture, by the deforming of said one end of the reinforcing member.

9. A composite member, comprising:

an elongated metal plate member having a marginal edge portion, a pair of elongated wooden members disposed on opposite sides of the marginal portion of the plate member, the plate member having a body portion projecting beyond the wooden members, each wooden member having an outside surface facing in a direction generally opposite to the direction of projection of the body portion of the plate member, connecting means for connecting the wooden members to the plate member, and a plurality of metal brace members, each brace member including a first leg portion interposed between one side of the marginal edge portion of the plate member and a wooden member, and a second leg portion projecting in a direction transverse to the first leg portion, the second leg portion being contiguous to a side of the wooden member which is opposite from the side of the wooden member on which the outside surface is located, the second leg portion having an extraneously-unsupported surface facing in a direction generally opposite to the direction of facing of the outside surface of the wooden member.

10. The composite member of claim 9, including:

means extending around the marginal edge portion of the plate member for interconnecting the first leg portions of the brace members.

11. A composite member, comprising:

a web member having a marginal edge portion, a pair of flange members disposed on opposite sides of the marginal edge portion of the web member, the web member having a body portion projecting beyond the flange members, each flange member having an outside surface facing in a direction generally opposite to the direction of projection of the body portion of the web member, a plurality of brace members, each brace member including a first leg portion interposed between one side of the marginal edge portion of the web member and a flange member, and a second leg portion projecting in a direction transverse to the first leg portion, the second leg portion being contiguous to a side of the flange member which is opposite from the side of the flange member on which the outside surface is located, interconnecting means extending around the marginal edge portion of the web member for interconnecting the first leg portions of the brace members, and connector means extending through aligned apertures in the web, flange and brace members, for connecting the web, flange and brace members.

12. The composite member of claim 11, the outside surfaces of the flange members being in generally coplanar relationship, at least a portion of the interconnecting means being in generally coplanar realtionship with the outside surface of the flange members.

13. The composite member of claim 11, each flange member comprising a wooden member.

14. The composite member of claim 11, the web, flange and brace members having juxtaposed surfaces, the connector means including a tubular member having a longitudinal axis, outside walls in tight frictional contact with walls defining the apertures, inside walls, and means including flared portions extending outwardly beyond the apertures, for clinching the web, flange and brace members together, and a reinforcing member positioned within the tubular member and including outside walls in tight frictional contact with inside walls of the tubular member, and opposite ends disposed on opposite sides of the juxtaposed surfaces and spaced axially inwardly from the flared portions of the tubular member.

15. The composite member of claim 11, the tubular member including means forming an annular recess in the inside walls, the reinforcing member including an annular locking rib projecting outwardly into the annular recess.

16. The composite member of claim 15, including:

means defining a second annular recess in the walls of an aperture, the second recess being located in alignment with the first-named recess, the tubular member including a second annular locking rib projecting outwardly into the second recess.

(References on following page)

References Cited

UNITED STATES PATENTS

| | | | |
|---|---|---|---|
| 133,737 | 12/1872 | Wootten | 85—38 |
| 1,759,057 | 5/1930 | Meem | 52—729 X |
| 2,129,167 | 9/1938 | Cunnington | 85—39 |
| 2,216,833 | 10/1940 | Barry | 29—523 |
| 2,499,315 | 2/1950 | Johnson | 85—37 |
| 3,029,912 | 4/1962 | Barker | 287—189.36 |
| 3,268,251 | 8/1966 | Troutner | 52—693 |

FOREIGN PATENTS 1,504,224  10/1967  France.

PRICE C. FAW, JR., Primary Examiner

U.S. Cl. X.R.

29—155, 507, 523; 85—37; 287—189.36

PO-1050
(5/69)

UNITED STATES PATENT OFFICE
CERTIFICATE OF CORRECTION

Patent No. 3,531,903      Dated October 6, 1970

Inventor(s) William D. Swanson

It is certified that error appears in the above-identified patent and that said Letters Patent are hereby corrected as shown below:

Column 5, line 54, after "marginal" insert --edge--.
Column 6, line 62, "11" should be --14--.

SIGNED AND SEALED
DEC 22 1970

(SEAL)
Attest:

Edward M. Fletcher, Jr.
Attesting Officer

WILLIAM E. SCHUYLER, JR.
Commissioner of Patents